US010277876B2

(12) United States Patent
Koo

(10) Patent No.: US 10,277,876 B2
(45) Date of Patent: Apr. 30, 2019

(54) RECORDING DUPLEXING METHOD AND APPARATUS FOR STREAMING VIDEO

(71) Applicant: N3N CO., LTD., Seoul (KR)

(72) Inventor: Ji Sin Koo, Paju-si (KR)

(73) Assignee: N3N CO., LTD., Seoul (KR)

( * ) Notice: Subject to any disclaimer, the term of this patent is extended or adjusted under 35 U.S.C. 154(b) by 0 days.

(21) Appl. No.: 15/665,439

(22) Filed: Aug. 1, 2017

(65) Prior Publication Data

US 2019/0045166 A1 Feb. 7, 2019

(51) Int. Cl.
*H04N 9/79* (2006.01)
*H04L 29/06* (2006.01)
*G08B 13/196* (2006.01)
*H04N 5/91* (2006.01)
*H04N 5/77* (2006.01)
*H04N 21/2743* (2011.01)
*H04N 21/231* (2011.01)
*H04N 21/647* (2011.01)
*H04N 7/18* (2006.01)
*H04L 12/707* (2013.01)

(52) U.S. Cl.
CPC ..... *H04N 9/7921* (2013.01); *G08B 13/19656* (2013.01); *G08B 13/19669* (2013.01); *H04L 65/4069* (2013.01); *H04L 65/80* (2013.01); *H04N 5/77* (2013.01); *H04N 5/91* (2013.01); *H04N 7/181* (2013.01); *H04N 21/231* (2013.01); *H04N 21/2743* (2013.01); *H04N 21/64738* (2013.01); *H04L 45/22* (2013.01)

(58) Field of Classification Search
CPC ........ H04N 9/7921; H04N 5/91; H04N 7/181; H04N 21/231; H04N 21/2743; H04N 21/64738; G08B 13/19656; G08B 13/19669; H04L 65/4069; H04L 65/80; H04L 45/22

See application file for complete search history.

(56) References Cited

U.S. PATENT DOCUMENTS

| 2002/0186961 | A1* | 12/2002 | Kikuchi | ................. | G11B 19/04 386/248 |
| 2006/0062545 | A1* | 3/2006 | Kim | ..................... | G11B 20/10 386/248 |
| 2010/0322590 | A1* | 12/2010 | Takehi | ..................... | H04N 5/76 386/235 |
| 2014/0317262 | A1* | 10/2014 | Bouvet | .................. | H04L 41/08 709/223 |

* cited by examiner

*Primary Examiner* — Hung Q Dang
*Assistant Examiner* — Sunghyoun Park
(74) *Attorney, Agent, or Firm* — Envision USA Inc.

(57) ABSTRACT

Provided is a first recording apparatus for recording a video stream in association with a second recording device. The first recording apparatus includes a video stream receiving unit for receiving a video stream from a video providing device via a network, a buffering unit recording a portion of the received video stream in a queue, a transmission unit relaying the video stream to the second recording device, a storage unit recording the video stream, and a switching unit for switching an operation mode to one of a relay mode for relaying the video stream to the second recording device based on a state report periodically received from the second recording device and a recording mode for storing the video stream in the storage unit.

18 Claims, 9 Drawing Sheets

RECORDING DUPLEXING METHOD AND APPARATUS FOR STREAMING VIDEO

CROSS-REFERENCE TO RELATED APPLICATIONS

This application is one of the results of Advanced Technology Center Association (ATC) project (Project No. 10052464 (2017 June~2019 May 31), Project Name: Multi-Dimensional Visualization Technique Research for analyzing IoT big data) hosted by Ministry Of Trade, Industry and Energy (MOTIE) and Korea Evaluation Institute of Industrial Technology (KEIT) in Republic of Korea

BACKGROUND

1. Field

The present invention relates to an image recording method and apparatus, and more particularly, to an image recording method and apparatus for recording a streaming video in real-time.

2. Description of the Related Art

Generally, when a remote video is received through a wired/wireless network and is recorded in real-time, unexpected limitations occur because a video providing device and a video recording device are different. As a result, recording is often interrupted.

FIG. 1 is a conceptual view illustrating a typical video recording system. As shown FIG. 1, the video recording system may include an video providing device 110, a router 120, and a recording device 130.

Referring to FIG. 1, the video providing device 110 may include a device for providing a video stream, such as a network camera, a video camera, a CCTV camera, a video providing server, and a portable photographing device. The video providing device 110 may be connected to the router 120.

The router 120 transmits a video stream received from the video providing device 110 to the video recording device 130 via a wired or wireless network.

As described above, recording may be stopped due to a failure of the network from the router 120 to the recording device 130, or seamless recording of the video stream may be interrupted due to a functional limitation of the recording device 130 itself.

In this case, particularly, in the case where recording of video stream related to security is interrupted, since an important record for recovering a property damage may be lost, a serious loss may be incurred.

SUMMARY

Accordingly, the present disclosure provides a video stream recording duplexing apparatus and method which is strong against unexpected recording interruption.

In one general aspect, provided is an apparatus for recording a streaming video, including a first recording device for recording a video stream in association with a second recording device, the first recording device including: a video stream receiving unit for receiving the video stream from a video providing device via a network; a buffering unit recording a portion of the received video stream in a queue; a transmission unit relaying the video stream to the second recording device; a storage unit recording the video stream; and a switching unit for switching an operation mode to one of a relay mode for relaying the video stream to the second recording device based on a state report periodically received from the second recording device and a recording mode for storing the video stream in the storage unit.

The switching unit may switch the operation mode such that the video stream from the queue is recorded in the storage unit based on a non-response time point of the state report from the second recording device.

The switching unit may include: a report receiving unit periodically receiving the state report from the second recording device; a determination unit for determining whether or not a recording failure occurs by comparing a reception time of the state report from the second recording device with a threshold time; and a switching performing unit for performing switching to the relay mode or the recording mode according to a determination result of the determination unit.

The switching unit may further include an average time calculating unit for measuring a reporting time from the second recording device and calculating an average report reception time, wherein whether or not the failure occurs is determined based on a report delay time measured in consideration of at least one of the measured average report reception time and a maximum buffering time.

It may be determined that a failure occurs when the measured report delay time is longer than a half of the maximum buffering time.

A predetermined maximum buffering time may be longer than a reception period of the state report.

When the state report is received from the second recording device while operating in the recording mode, the operation mode may be switched to the relay mode based on a report resuming point to relay the video stream to the second recording device.

When a third recording device is connected to the second recording device, the second recording device may switch to the relay mode for the third recording device.

The storage unit may record the video stream in an external database that is shared with the second recording device.

The state report may include at least one of a state report about a network of the first recording device and the second recording device, and a state report about a recording function of the second recording device.

In another general aspect, provided is a method for recording a streaming video, the method of a first recording device for recording a video stream in association with a second recording device including: receiving unit for receiving the video stream from an video providing device via a network; recording a portion of the received video stream in a queue; relaying the video stream to the second recording device; and switching an operation mode to one of a relay mode for relaying the video stream to the second recording device based on a state report periodically received from the second recording device and a recording mode for storing the video stream in the storage unit.

The switching of the operation mode may include switching the operation mode such that the video stream from the queue is recorded in the storage unit based on a non-response time point of the state report from the second recording device.

The switching of the operation mode may include: periodically receiving a state report from the second recording device; determining whether or not a recording failure occurs by comparing a reception time of the state report from the second recording device with a threshold time; and performing switching to the relay mode or the recording mode according to the determination result.

The method may further include calculating an average report reception time by measuring a reporting time from the second recording device, wherein whether or not the failure occurs is determined based on a report delay time measured in consideration of at least one of the measured average report reception time and a maximum buffering time.

It may be determined that a failure occurs when the measured report delay time is larger than a half of the maximum buffering time.

A predetermined maximum buffering time may be longer than a reception period of the state report.

In another general aspect, provided is an apparatus for recording a streaming video, including a second recording device for recording the streaming video in association with a first recording device receiving a video stream from an video providing device via a network, the second recording device including: a video stream receiving unit for receiving a video stream from the first recording device through a network; a storage unit recording the video stream; and a reporting unit for periodically reporting a state of the network or recording function to the first recording device to prevent a recording omission of the video stream.

The first recording device may switch an operation mode to one of a relay mode for relaying the video stream to the second recording device based on the state report from the second recording device and a recording mode for storing the video stream in the storage unit, switching a flow of the video stream such that the video stream from the queue is recorded in the storage unit based on a non-response time point of the state report from the second recording device.

In another general aspect, provided is a method for recording a streaming video by a second recording device for recording the streaming video in association with a first recording device receiving a video stream from an video providing device via a network, the method including: receiving the video stream from the first recording device via a network; recording the video stream; and periodically reporting a state of the network or recording function to the first recording device to prevent a recording omission of the video stream.

The first recording device may switch an operation mode to one of a relay mode for relaying the video stream to the second recording device based on the state report from the second recording device and a recording mode for storing the video stream in the storage unit, switching a flow of the video stream such that the video stream from the queue is recorded in the storage unit based on a non-response time point of the state report from the second recording device.

Other features and aspects will be apparent from the following detailed description, the drawings, and the claims.

duplexing apparatus and method of the present invention, a recordable point of a remote video stream is multiplexed, and thus a recovery latency can be overcome. Thus, even if a failure occurs on a recording device, a video can be seamlessly recorded. In addition, since unnecessary equipment can be minimized, the cost burden can be reduced.

DETAILED DESCRIPTION OF THE EMBODIMENTS

Figure 1:
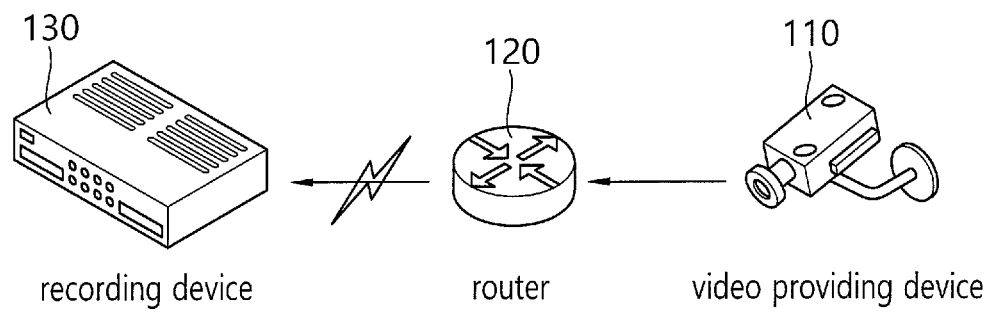
FIG. 1 is a conceptual view illustrating a typical video recording system.

Since the present invention can be modified into various types and can be implemented into various embodiments, specific embodiments will be illustrated in the drawings and described in this disclosure in detail.

However, the present invention is not limited to a specific implementation type, but should be construed as including all modifications, equivalents, and substitutes involved in the spirit and the technical scope of the present invention.

The terms such as "a first/the first" and "a second/the second" may be used to describe various components, but the components should not be limited by the terms. The terms are used only in order to distinguish one component from another component. For example, a first component may be named a second component without deviating from the scope of the present invention, and similarly, the second component may be named the first component. The term "and/or" encompasses a combination of a plurality of related items or any one of a plurality of related items.

It should be understood that when an element is referred to as being "connected" or "coupled" to another element, it may be directly connected or coupled to the other element but another element may also be interposed therebetween. On the other hand, when an element is referred to as being "directly connected" or "directly coupled" to another element, it should be understood that there are no other elements in between.

In the following description, the technical terms are used only for explaining specific embodiments while not limiting the present invention. The terms of a singular form may include plural forms unless referred to the contrary. In this disclosure, the terms "include," "include," or "have" specify features, numbers, steps, operations, elements or combinations thereof, but do not exclude existence or addition possibility of one or more other features, numbers, steps, operations, elements or combinations thereof.

Unless described otherwise, all terms used herein including technical or scientific terms may include the same meaning as those generally understood by persons skilled in the art to which the present invention belongs. Terms as defined in dictionaries generally used should be construed as including meanings which accord with the contextual meanings of related technology. Also, unless clearly defined in this disclosure, the terms should not be construed as having ideal or excessively formal meanings.

Hereinafter, exemplary embodiments of the present invention will be described in detail with reference to the accompanying drawings. In order to help the overall understanding of the present disclosure, the same reference numerals will be used for the same elements in the drawings, and a duplicate description of the same elements will be omitted.

Figure 2:
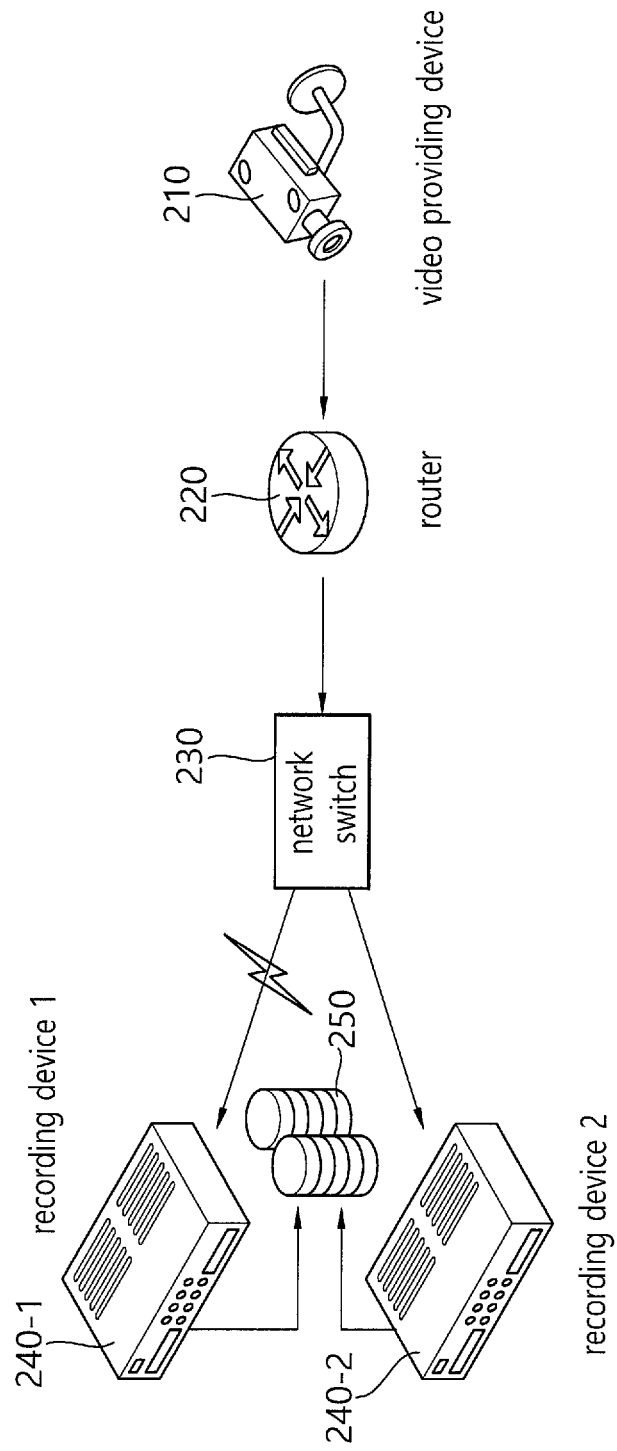
FIG. 2 is a conceptual view illustrating a video recording system disposed in parallel for recovering a recording failure.

FIG. 2 is a conceptual view illustrating a video recording system disposed in parallel for recovering a recording failure. As shown in FIG. 2, the video recording system may include an video providing device 210, a router 220, a network switch 230, and recording devices 240-1 and 240-2.

Referring to FIG. 2, the video providing device 210 may perform the same functions as the device 110 of FIG.

The router 220 may also perform the same functions as the device 120 of FIG. 1. The router 220 may transmit a video stream received from the video providing device 210 to the recording devices 240-1 and 240-2 through a network such as Transmission Control Protocol/Internet Protocol (TCP/IP) or User Datagram Protocol (UDP). In this case, the video stream may be transmitted in real-time.

In the video recording system, a machine-to-machine (M2M) network connection may be established through TCP/IP or UDP. After a mutual connection is established, it may be difficult to change a path while the connection is being maintained. Accordingly, a network switch 230 may be disposed in front of the video recording devices 240-1 and 240-2, thereby bypassing to a backup line when there is no line response. Thus, the recording disabled state may be supplemented.

The network switch 230 may provide a video stream to a specific recording device 240-1 in a normal state (no problem in recording). In this case, the line response may be monitored. When there is no line response during monitoring, the line may be switched to the backup line, that is, to another path. Accordingly, the video stream can be transmitted to the recording device 240-2.

The recording devices 240-1 and 240-2 may receive and store a video stream when a line is connected according to the line connection switching of the network switch 230. In this case, the two or more recording devices 240-1 and 240-2 may store the received video stream in a common database 250.

However, when a recording failure occurs during video stream recording through the parallel arrangement, a record as much as the recovery latency from the recognition of the recording disabled state during the monitoring of the line response to the switching to the backup line may be lost. In this case, the cost may increase due to the addition of subsidiary device.

Figure 3:
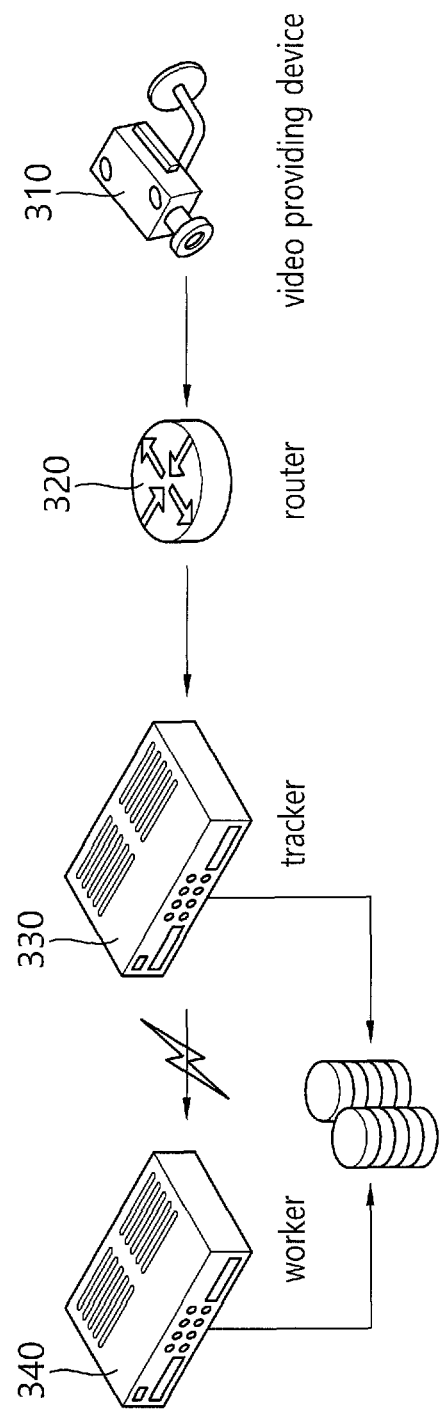
FIG. 3 is a view illustrating a video recording duplexing system according to an embodiment of the present invention.

FIG. 3 is a view illustrating a video recording duplexing system according to an embodiment of the present invention. As shown in FIG. 3, the video recording duplexing system according to an embodiment of the present invention may include an video providing device 310, a router 320, a tracker 330, and a worker 340.

Referring to FIG. 3, the video providing device 310 may provide a target video stream to the router 320.

The router 320 may provide the video stream to the tracker 330 via a wired/wireless network.

The tracker 330 may be configured to relay the video stream received from the router 320 to the worker 340 such that the worker 340 performs real-time recording. The tracker 330 may receive video in real-time, may provide the received video to the worker 340, and may periodically receive recording-related reports from the worker 340 to check whether or not there is an abnormality in the recording. Then, when the recording disabled state occurs, the tracker 330 may detect a recording disabled point and allow the video stream to be recorded from the detected point, thereby removing the recording interruption due to the recovery latency.

The tracker 330 may receive a request for remote video relay from the worker 340, and may perform a relay operation. The tracker 330 may receive a video from the video providing device 310, and may buffer the received video in a queue for a certain time (e.g., at least about 15 seconds for failure recovery time). Thereafter, the tracker 330 may relay the video stream to the worker 340 together with buffering.

The tracker 330 may be a device having a recording function and a communication/relay function, and may include Video Cassette Recorders (VCRs), Digital Video Recorders (DVRs), Personal Video Recorders (PVRs), PCs, Personal Digital Assistants (PDAs), smart phones, laptops, netbooks, Consumer Electronics (CE), replay consumer electronics with a wireless communication function, Internet consumer electronics, set-top boxes, and the like.

The worker 340 may record a video stream received from the tracker 330. The worker 340 may generate a state report message including information on whether or not recording is currently possible and/or whether or not normal recording is performed, and may transmit the state report message to the tracker 330 according to a specific period. When the worker 340 becomes unrecordable (e.g., due to a network failure or a recording function failure), the tracker 330 may detect the recording disabled state through the absence of the state report for a certain time. In this case, the tracker 330 may search for an interruption part from the queue based on a non-response time point, and then may resume recording.

The worker 340 may be a device having a recording function and directly connected to the tracker 330. The worker 340 may also include VCRs, DVRs, PVRs, and various kinds of computing devices and/or terminals like the tracker 330.

According to an embodiment of the present invention, the tracker 330 and the worker 340 may record a video stream in a common database in connection with each other. In this case, the tracker 330 may find the point of time when the recording from the worker 340 is stopped based on the video stream already recorded in the common database, and may record the video in the common database from the corresponding point of the buffered video stream of the queue. Thus, a seamless video may be recorded in the common database without a separate operation.

According to an embodiment of the present invention, recording can be seamlessly performed even when a recording failure of the worker 340 occurs. Also, recording without an original video conversion can be implemented only with a device of low specification (e.g., desktop). In addition, since no additional cost such as the provision of a network switch is required, the cost may be low and the configuration thereof may be simple.

Figure 4:
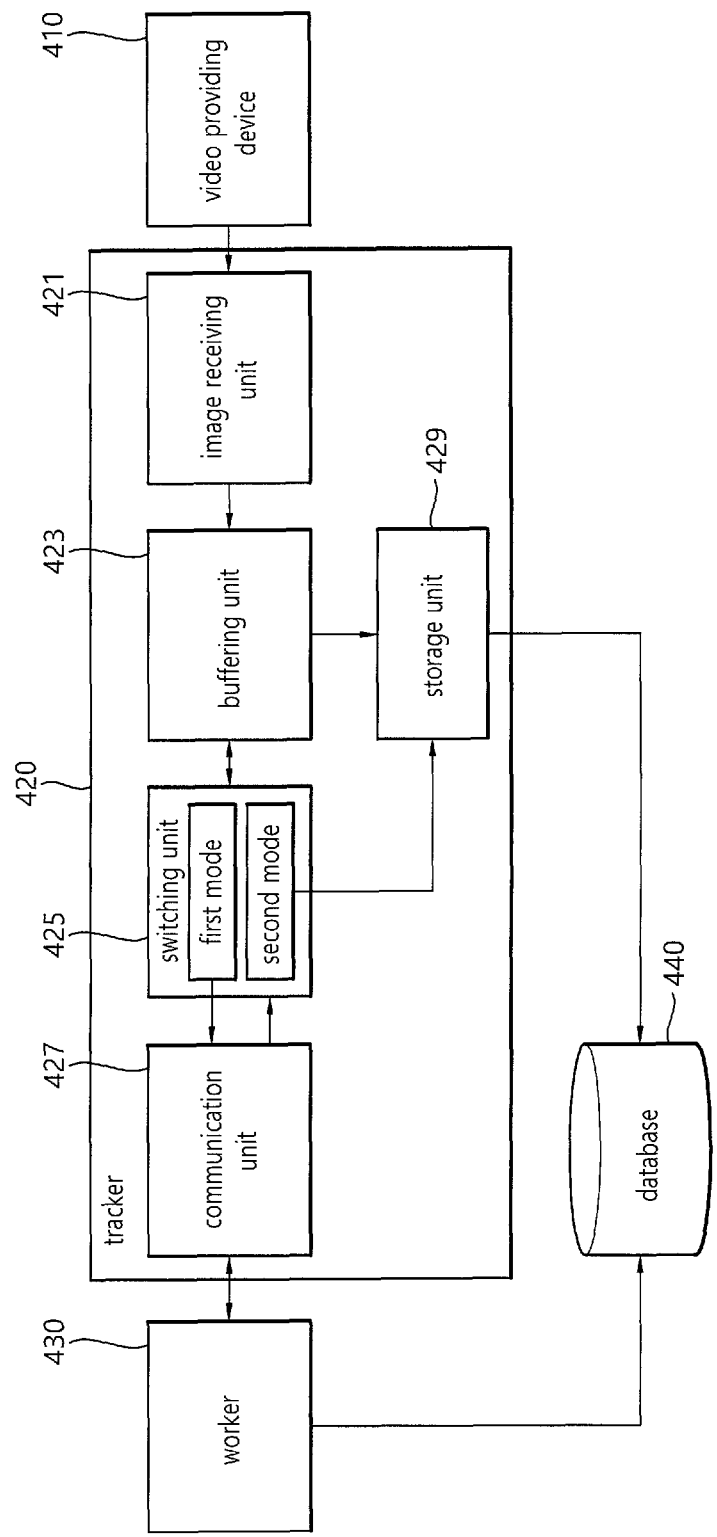
FIG. 4 is a schematic view illustrating a configuration of a tracker device according to an embodiment of the present invention.

FIG. 4 is a schematic view illustrating a configuration of a tracker device according to an embodiment of the present invention. As shown in FIG. 4, a tracker device 420 may include an image receiving unit 421, a buffering unit 423, a switching unit 425, a communication unit 427, and a storage unit 429.

Each of the components may be implemented with one hardware processor or a plurality of hardware processors, and a plurality of components may be distributed over a plurality of processors. The processor may also perform functions based on commands from a memory (not shown) including commands for instructing the functions of the corresponding component.

Referring to FIG. 4, the image receiving unit 421 may receive a video stream from an video providing device 410 or a router (not shown). The image receiving unit 421 may perform a function of receiving a video stream introduced from a wired/wireless network. The image receiving unit 421 may include an antenna and/or a communication processor. The image receiving unit 421 may receive a video stream in real-time, and may receive a plurality of video streams multiplexed through a plurality of channels.

The buffering unit 423 may temporarily store the video stream received from the image receiving unit 421 in at least one queue. A maximum buffering time may be set in the buffering unit 423. The maximum buffering time may be set as a default value, or may be set directly by a user through a user interface (not shown). The maximum buffering time may be varied even during the recording or relaying operation. However, the maximum buffering time may be longer than the period of the state report from the worker 430. The buffering unit 423 may store a video stream in the storage unit 429 from a specific portion (or a specific frame) of the video stream buffered in the queue according to the control signal of the switching unit 425.

The switching unit 425 may receive a video stream from the buffering unit 423 and/or the image receiving unit 421, and may provide the video stream to the communication unit 427 or the storage unit 429. A mode of providing to the communication unit 427 may be defined as a first mode (or referred to as a relay mode), and a mode of providing to the storage unit 429 may be defined as a second mode (or referred to as a recording mode). The switching unit 425 may be basically set to operate in the first mode. According to the first mode, the video stream received through the buffering unit 423 and/or the image receiving unit 421 may be relayed to the worker 430 on the assumption of the normal recording of the worker 430.

The switching unit 425 may determine whether or not the normal recording operation of the worker 430 is performed based on a state report message of the worker 430 transmitted from the communication unit 427, and may obtain information on whether or not the normal recording is currently performed. For example, when a recording failure situation in which normal recording is not performed is detected, the switching unit 425 may switch the operation mode from the first mode to the second mode. In regard to the detection of the recording failure situation, the switching unit 425 may compare a state report time received from the worker 430 with a predetermined threshold time. In this case, when the state report is not received over the threshold time, it may be determined that the recording failure situation occurs. In this case, the threshold time may be set as the maximum buffering time. Alternatively, the switching unit 425 may determine occurrence of a recording failure situation according to a critical condition. The critical condition may include conditions that a delay time (e.g., the time from the most recent state reporting time to the current time point when no state report is received) of the state report is larger than an average reception time value of the state report and/or that the delay time of the state report is larger than the half of the set maximum buffering time. When the above critical condition is satisfied, it may be determined that the connection with the worker 430 is released or the worker 430 is unrecordable, and the operation mode may be switched to the second mode in which the tracker 420 directly records the video stream. According to the second mode, the switching unit 425 may allow the video stream to be directly stored in the storage unit 429. The switching unit 425 may receive the buffered video stream from the buffering unit 423 to provide the buffered video stream to the storage unit 429, or may give an instruction to the buffering unit 423 such that the buffering unit 423 directly stores the video stream in the storage unit 429. In this case, it may be assumed that the worker 430 did not record the video stream from the time point of the non-response of the report, and the video stored in the queue of the buffering unit 423 may be stored in the storage unit 429 from the corresponding time point by finding the non-response time point.

Also, when the report is resumed from the worker 430, the switching unit 425 may switch the operation mode from the second mode to the first mode at the time of receiving the state report again, allowing the worker 430 to record the video stream again and allowing itself to serve as a repeater.

The communication unit 427 may provide a connection with the worker 430. The connection may be implemented through a wired or wireless network. The communication unit 427 may include a modem, an antenna, a communication modem, and/or a communication processor. Thus, various kinds of information including a video stream may be transmitted and received to/from the worker 430. When the switching unit 425 is in the first mode, the communication unit 427 may transmit the video stream to the worker 430. The communication unit 427 may periodically receive a state report from the worker 430, and may provide the state report to the switching unit 425.

In the second mode, the storage unit 429 may receive the buffered video stream from the switching unit 425 or the buffering unit 423, and may store the video stream in its own memory (not shown) and/or a database 440. The memory may include a hard disk, a flash disk, and a RAM/ROM which are permanently disposed in the tracker device 420.

Figure 5:
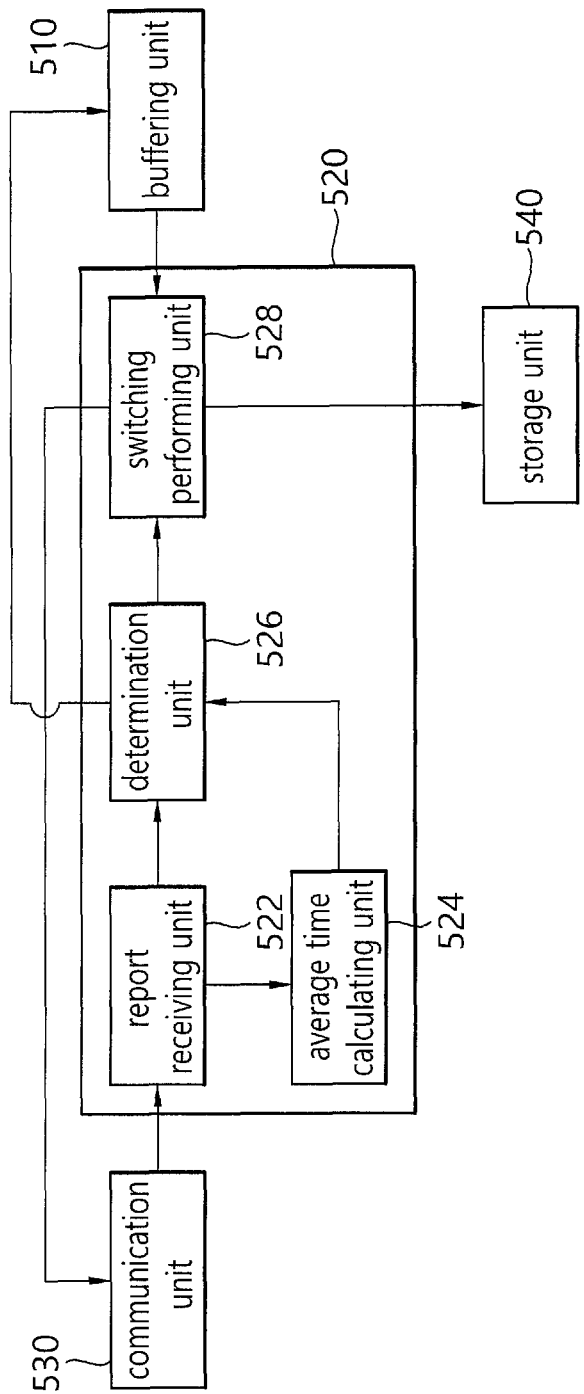
FIG. 5 is a detailed view illustrating a switching unit of a tracker device according to an embodiment of the present invention.

FIG. 5 is a detailed view illustrating a switching unit of a tracker device according to an embodiment of the present invention. As shown in FIG. 5, a switching unit 520 according to an embodiment of the present invention may include a report receiving unit 522, an average time calculating unit 524, a determination unit 526, and a switching performing unit 528.

Referring to FIG. 5, the report receiving unit 522 may receive a state reporting message from the worker through the communication unit 530.

The average time calculating unit 524 may record, by a certain capacity, the reception time information of the state reporting message received through the report receiving unit 522. Based thereon, the average period of the report may be calculated.

The determination unit 526 may determine whether or not a failure occurs through the following switching condition (or critical condition) based on the state reporting message from the report receiving unit 522 and the average period information of the reporting message from the average time calculating unit 524.

—Switching Conditions

Rt=state report reception time received from worker
Bm=set maximum buffering time
Vt=average period of Rt
Tn=delay time of measured Rt
When (i) Vt<Tn && (ii) Tn>(Bm/2), switching is performed According to the switching conditions, the determination unit 526 may measure the delay time Tn based on the state report reception time, and when the measured delay time Tn is larger than the average period Vt and/or the measured delay time Tn is larger than the half of the maximum buffering time Bm, may determine that a recording failure state has occurred. In this case, the delay time may be calculated from the non-response time point. The switching condition may not be based on the half of the maximum buffering time Bm, but may be based on the maximum buffering time Bm itself or a time obtained by subtracting a certain time from the maximum buffering time Bm. The switching condition may be arbitrarily set by a user through a user interface. In this case, the determination unit 526 may detect occurrence of a failure, and may provide a control signal for instructing a mode change to the switching performing unit 528. At the same time, the determination unit 526 may detect a non-response time point (e.g., the latest state report signal reception time), and may provide a control signal for instructing to store the buffered video stream from the corresponding time point to a buffering unit 510.

Also, the determination unit 526 may determine the starting point of the state report reception of the reception unit 522 through the time point when the state report is resumed in a state of being switched to the second mode, that is, in a situation where the failure occurrence is proceeding. In this case, the determination unit 526 may provide the switching performing unit 528 with a control signal instructing to change the operation mode from the second mode to the first mode.

The switching performing unit 528 may be a component that performs the operation mode switching to the first mode or the second mode. In the first mode, the buffered video stream may be transmitted to the worker through a communication unit 530. On the other hand, in the second mode, the buffered video stream may be transmitted to a storage unit 540. When a switching instruction control signal of the determination unit 526 is received, the first mode may be switched to the second mode, and the second mode may be switched to the first mode.

Figure 6:
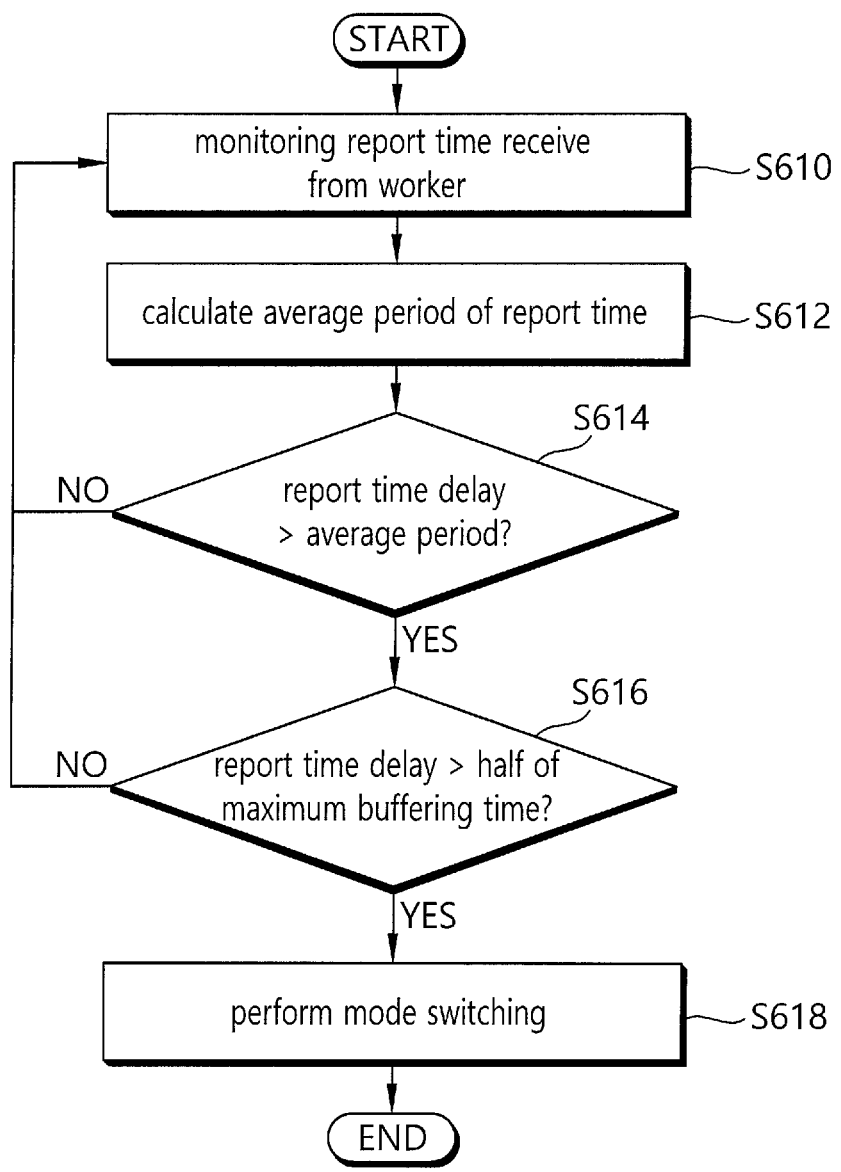
FIG. 6 is a flowchart illustrating a failure determination method in the switching unit of FIG. 5.

FIG. 6 is a flowchart illustrating a failure determination method in the switching unit of FIG. 5.

Referring to FIG. 6, the switching unit may monitor the report time received from the worker in real-time (S610). Thereafter, the average period of the report time may be calculated (S612). Thereafter, the report time delay amount (delay time calculated based on the non-response time) may be measured, and the measured report time delay amount may be compared with the average period value (S614). If it is determined that the report time delay amount is larger than the average period, the report time delay amount may be compared with the half of the maximum buffering time (S616). In this case, the comparison condition need not be the half of the maximum buffering time, and may be a time condition arbitrarily set by a user or the maximum buffering time itself. If the reporting time delay amount exceeds the half of the maximum buffering time, it may be determined that a failure has occurred and mode switching may be performed (S618). This may show a switching mechanism from the first mode to the second mode.

The mode switching from the second mode to the first mode may be performed by monitoring the moment when the state report is resumed while operating in the second mode.

Figure 7:
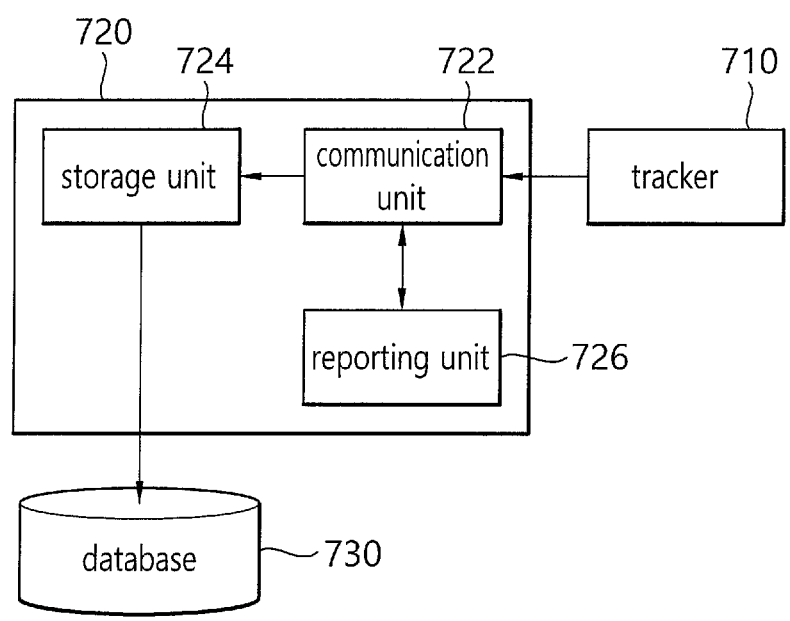
FIG. 7 is a schematic view illustrating a configuration of a worker device according to an embodiment of the present invention.

FIG. 7 is a schematic view illustrating a configuration of a worker device according to an embodiment of the present invention. As shown in FIG. 7, a worker device 720 may include a communication unit 722, a storage unit 724, and a reporting unit 726.

The components of the worker 720 may also be implemented with one hardware processor or a plurality of hardware processors, and a plurality of components may be distributed over a plurality of processors.

Referring to FIG. 7, the communication unit 722 may be a component for communicating with a tracker 710, and may include an antenna, a communication module, and the like. The communication unit 722 may receive a video stream received from the tracker 710, and may transmit a state reporting message generated in the reporting unit 726 to the tracker 710.

The storage unit 724 may store the received video stream in its own memory (not shown) and/or a database 730. The memory may include a hard disk, a flash disk, and a RAM/ROM which are permanently disposed in the worker device 720.

The reporting unit 726 may generate a state reporting message indicating that normal recording is being performed in accordance with a preset reporting period. The state reporting message may not be generated when the recording is currently impossible, e.g., when the recording function fails, when the entire processor fails, or when an internal failure occurs in the device.

The reporting unit 726 may transmit a state reporting message indicating that recording is disabled from the current time point to the tracker 710. When receiving this message, the tracker 710 may switch the operation mode from the second mode to the first mode based on the latest received state reporting message (message including the fact that the normal recording is performed) based on the reception time point.

According to another embodiment of the present invention, the reporting period may be arbitrarily changed by a user. The changed reporting period may be shared with the tracker 710. The tracker 710 may omit separate calculation of the reception average period through the reporting period information. The changed reporting period information may be directly reflected in the switching condition.

The message generated through the reporting unit 726 may be transmitted to the tracker 710 through the communication unit 722.

The worker device 720 may further include a decoding unit (not shown). The decoding unit may decode the received video stream, and may allow the decoded stream to be stored. Also, the worker device 720 may further include a replaying unit for replaying a video, and may allow a decoded stream to be replayed through the replaying unit.

Figure 8:
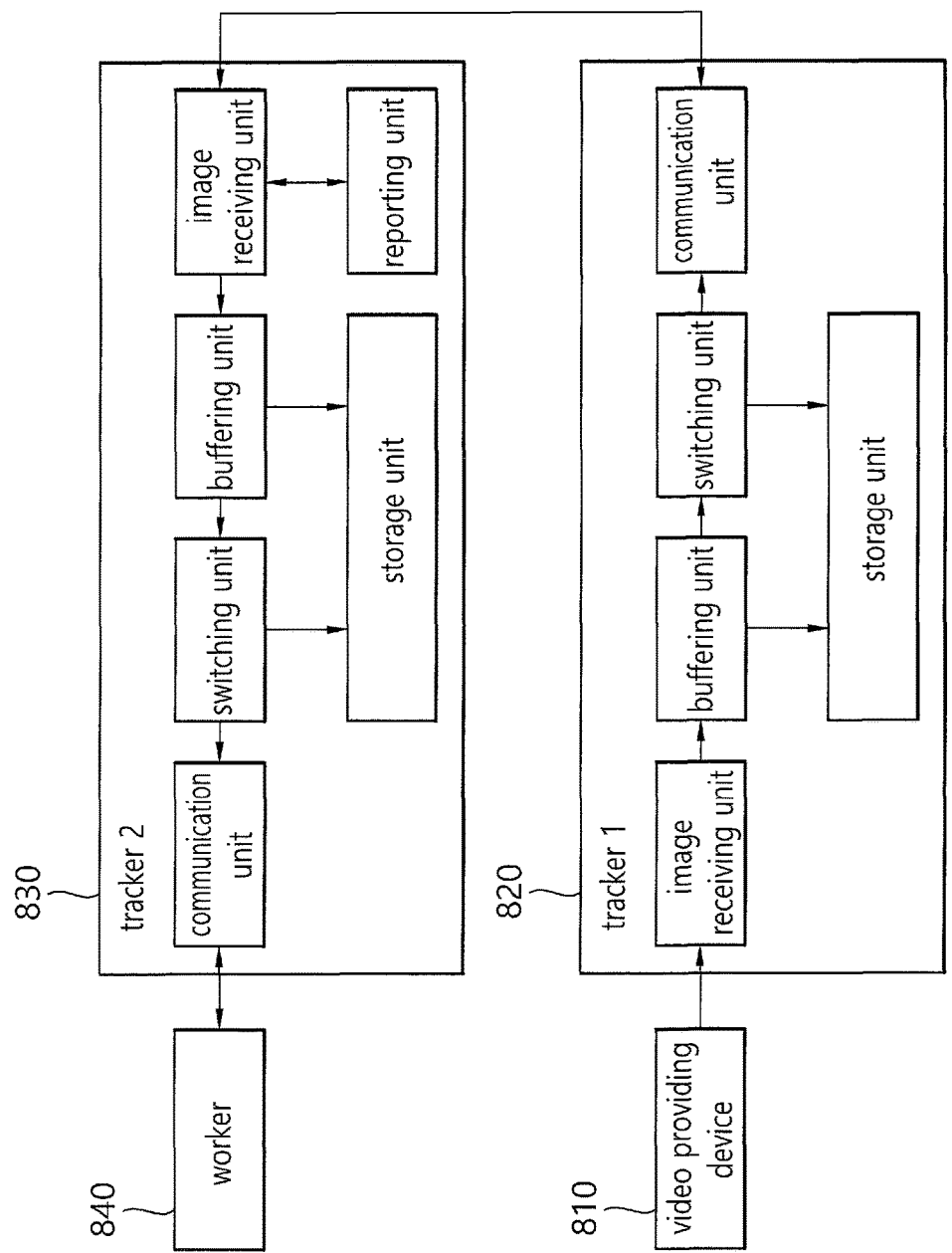
FIG. 8 is a view showing a video recording system to which a new worker device is connected.

FIG. 8 is a view showing a video recording system to which a new worker device is connected.

Referring to FIG. 8, before a worker 840 is first connected to a second tracker 830, the second tracker 830 may serve as the worker described above. Accordingly, a reporting unit may be included, and the operation may be performed in a form of directly storing through image reception.

In this situation, when the worker 840 is newly connected, the operations the two workers may be unnecessary. Accordingly, the second tracker 830 may switch from serving as a worker to serving as a tracker. The second tracker 830 may receive the video stream from the first tracker 820 through the image receiving unit, and may perform buffering and relay operations. Also, the second tracker 830 may receive a state reporting message about whether or not the normal recording is being currently performed from the worker 840. Thereafter, based on the received message, the report unit may generate a state reporting message reporting its own normal recording state, and may transmit the state reporting message to the first tracker 820.

If an abnormality (e.g., a network failure between the second tracker 830 and the worker 840, a malfunction of the worker 840, etc.) occurs in the worker 840, the second tracker 830 may switch its own operation mode from the first mode to the second mode through a switching unit. That is, the second tracker 830 may operate as a worker again. In the meantime, the second tracker 830 may transmit a state report to the first tracker 820 to notify the normal recording through the reporting unit.

If an abnormality (e.g., a network failure between the first tracker 820 and the second tracker 830, a malfunction of the second tracker 830, etc.) occurs in the second tracker 830, the first tracker 820 may also switch the operation mode to the second mode through the switching unit.

That is, this may mean that the worker device and the tracker device may be configured to be directly switched and used without a particular distinction. both the worker component and the tracker component may be included in a single device.

Figure 9:
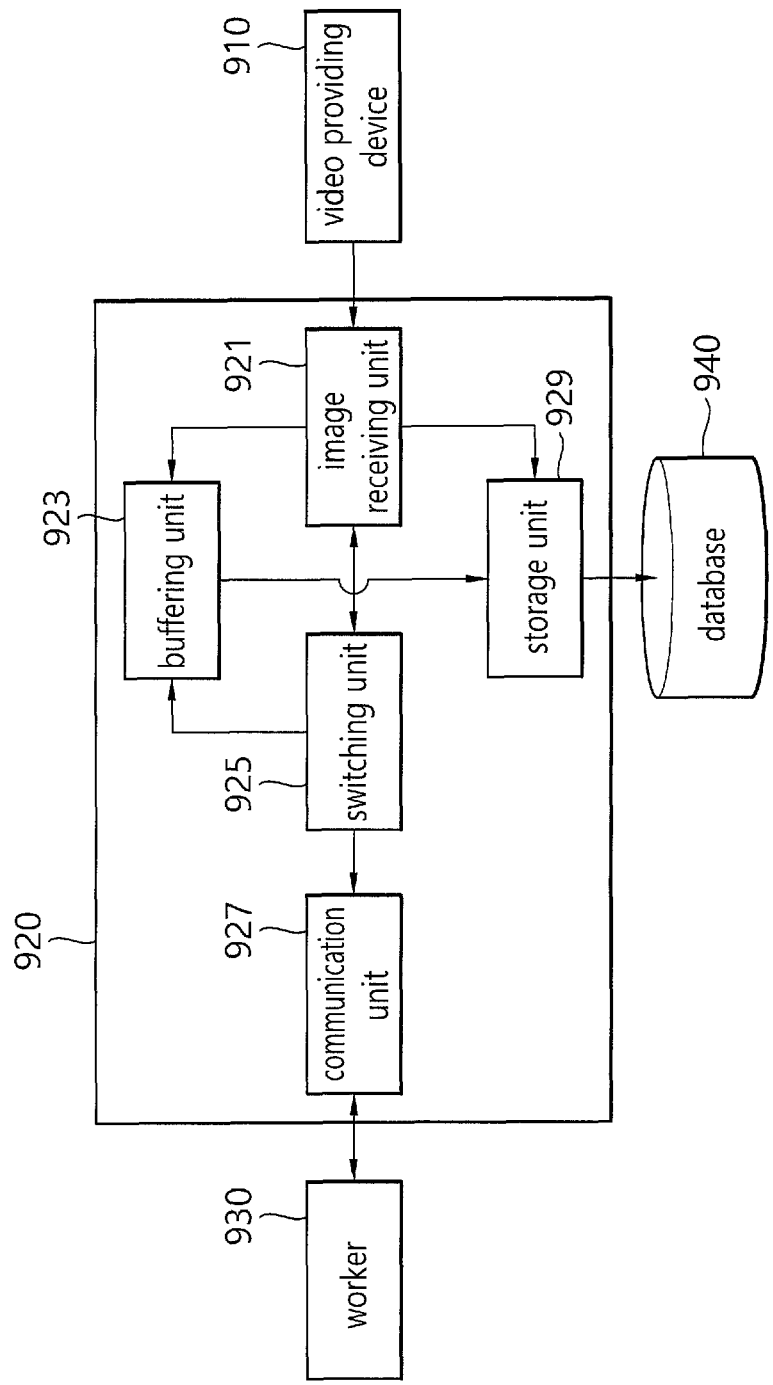
FIG. 9 is a view illustrating a configuration of a tracker device according to another embodiment of the present invention.

FIG. 9 is a view illustrating a configuration of a tracker device according to another embodiment of the present invention. As shown in FIG. 9, a tracker device 920 may include an image receiving unit 921, a buffering unit 923, a switching unit 925, a communication unit 927, and a storage unit 929.

Referring to FIG. 9, the image receiving unit 921, the buffering unit 923, the switching unit 925, the communication unit 927, and the storage unit 929 may perform the basically same operations as the corresponding components 421, 423, 425, 427 and 429 of FIG. 4, respectively.

However, the switching unit 925 may directly receive a video stream from the image receiving unit 921 in addition to a video stream buffered in the buffering unit 923, and may relay the video streams to the worker 930. Upon switching from the first mode to the second mode by detecting the occurrence of a recording failure, a control signal may be directly transmitted to the image receiving unit 921 such that a video stream being received is directly stored in the storage unit 929 without passing the switching unit 925 and/or the buffering unit 923. In this case, the switching unit 925 may also transmit a control signal to the buffering unit 923 such that the video stream can be recorded in the storage unit 929 from a stream after the state report non-response time point among the currently buffered stream. Alternatively, the switching unit 926 may allow the recording of the whole of the currently buffered stream to be performed.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A first recording apparatus for recording a video stream in association with a second recording device, comprising:
    a video stream receiving unit for receiving the video stream from a video providing device via a network;
    a buffering unit for buffering a portion of the received video stream in a queue;
    a transmission unit for relaying the video stream to the second recording device;
    a storage unit for recording the video stream; and
    a switching unit for switching an operation mode between a relay mode for relaying the video stream to the second recording device and a recording mode for storing the video stream in the storage unit,
    wherein the operation mode is switched between the relay mode and the recording mode based on a state report periodically received from the second recording device,
    wherein the state report includes information indicating a current recording in the second recording device being performed normally, and
    wherein the switching unit further comprising:
        a report receiving unit for periodically receiving the state report from the second recording device;
        a determination unit for determining whether or not a recording failure is occurred by comparing a reception time of the state report from the second recording device with a threshold time; and
        a switching performing unit for performing the switching of the operation mode between the relay mode and the recording mode according to a result by the determination unit.

2. The apparatus of claim 1, wherein the switching unit switches the operation mode such that the video stream buffered in the queue is recorded in the storage unit based on a non-response time point of the state report from the second recording device.

3. The apparatus of claim 1, wherein the switching unit further comprising:
    an average time calculating unit for measuring a reporting time from the second recording device and calculating an average report reception time,
    wherein an occurrence of the recording failure is determined based on a report delay time measured by using either the measured average report reception time or a maximum buffering time.

4. The apparatus of claim 3, wherein the recording failure is occurred when the measured report delay time is longer than a half of the maximum buffering time.

5. The apparatus of claim 1, wherein a predetermined maximum buffering time is longer than a reception period of the state report.

6. The apparatus of claim 1, wherein, when the state report is received from the second recording device during the recording mode, the operation mode is switched to the relay mode based on a report resuming point to relay the video stream to the second recording device.

7. The apparatus of claim 1, wherein, when a third recording device is connected to the second recording device, the second recording device switches to the relay mode for the third recording device.

8. The apparatus of claim 1, wherein the storage unit records the video stream in an external database that is shared with the second recording device.

9. The apparatus of claim 1, wherein the state report comprises at least one of a state report about a network of the first recording device and the second recording device, and a state report about a recording function of the second recording device.

10. A method for recording a video stream carried out by a first recording apparatus, the method comprising:
    receiving the video stream from an video providing device via a network;
    recording a portion of the received video stream in a queue;
    relaying the video stream to a second recording device; and
    switching an operation mode between a relay mode for relaying the video stream to the second recording device and a recording mode for storing the video stream in the storage unit, wherein the operation mode is switched between the relay mode and the recording mode based on a state report periodically received from the second recording device, wherein the state report includes information indicating a current recording in the second recording device being performed normally, and wherein the switching of the operation mode further comprising:
periodically receiving the state report from the second recording device;
determining whether or not a recording failure is occurred by comparing a reception time of the state report from the second recording device with a threshold time; and
performing the switching of the operation mode between the relay mode and the recording mode according to a result of the determination.

11. The method of claim 10, wherein the switching of the operation mode comprises switching the operation mode such that the video stream buffered in the queue is recorded in the storage unit based on a non-response time point of the state report from the second recording device.

12. The method of claim 10, further comprising:
calculating an average report reception time by measuring a reporting time from the second recording device,
wherein an occurrence of the recording failure is determined based on a report delay time measured by using either the measured average report reception time or a maximum buffering time.

13. The method of claim 12, wherein the recording failure is occurred when the measured report delay time is longer than a half of the maximum buffering time.

14. The method of claim 12, wherein a predetermined maximum buffering time is longer than a reception period of the state report.

15. A second recording device for recording a streaming video in association with a first recording device receiving a video stream from an video providing device via a network, the second recording device comprising:
a video stream receiving unit for receiving the video stream from the first recording device through the network;
a storage unit for recording the video stream; and
a reporting unit for periodically reporting a state of the network or recording function to the first recording device to prevent a recording omission of the video stream,
wherein the state report includes information indicating a current recording in the second recording device is being performed normally,
wherein the state report is used by the first recording device for switching an operation mode between a relay mode for relaying the video stream to the second recording device and a recording mode for storing the video stream in a storage unit of the first recording unit,
wherein an occurrence of a recording failure is determined by comparing a reception time of the state report from the second recording device with a threshold time,
wherein the switching of the operation mode is performed based on the occurrence of the recording failure.

16. The second recording device of claim 15,
wherein the first recording device switches a flow of the video stream such that the video stream from the queue is recorded in the storage unit based on a non-response time point of the state report from the second recording device.

17. A method for recording a streaming video by a second recording device for recording the streaming video in association with a first recording device receiving a video stream from an video providing device via a network, the method comprising:
receiving the video stream from the first recording device via the network;
recording the video stream; and
periodically reporting a state of the network or recording function to the first recording device to prevent a recording omission of the video stream,
wherein the state report includes information indicating a current recording in the second recording device is being performed normally,
wherein the state report is used by the first recording device for switching an operation mode between a relay mode for relaying the video stream to the second recording device and a recording mode for storing the video stream in a storage unit of the first recording unit,
wherein an occurrence of a recording failure is determined by comparing a reception time of the state report from the second recording device with a threshold time,
wherein the switching of the operation mode is performed based on the occurrence of the recording failure.

18. The method of claim 17,
wherein the first recording device switches a flow of the video stream such that the video stream from the queue is recorded in the storage unit based on a non-response time point of the state report from the second recording device.

* * * * *